United States Patent [19]

Clagett et al.

[11] Patent Number: 5,218,633
[45] Date of Patent: Jun. 8, 1993

[54] ENHANCED ACCESS TO TELECOMMUNICATIONS NETWORK

[75] Inventors: Donald J. Clagett, Rockville; Kenneth W. Clark, Sykesville, both of Md.; Ann M. E. Courtemanche; Walter D. Moran, both of Arlington, Va.

[73] Assignee: Bell Atlantic Network Services, Inc., Arlington, Va.

[21] Appl. No.: 834,053

[22] Filed: Feb. 11, 1992

[51] Int. Cl.⁵ .................... H04M 11/08; H04M 17/00
[52] U.S. Cl. ...................................... 379/144; 379/96; 379/110; 379/155
[58] Field of Search .................. 379/144, 96, 90, 97, 379/110, 155

*Primary Examiner*—Stafford Schreyer
*Attorney, Agent, or Firm*—Lowe, Price, LeBlanc & Becker

[57] ABSTRACT

A public pay telephone station constructed to accept user carried media which may be in the form of CD disks which are capable of storing a variety of data or information for interacting with the public telephone station. The station is provided with a display screen and control switches. Interaction is provided between the database in the user disk and distributed databases in the telecommunications network. The system provides sophisticated services based upon the massive data storage capacity of the CD disk used in conjunction with a microprocessor and memory in the telephone station as combined with the virtually limitless distributed storage data and capabilities of the telephone network.

22 Claims, 5 Drawing Sheets

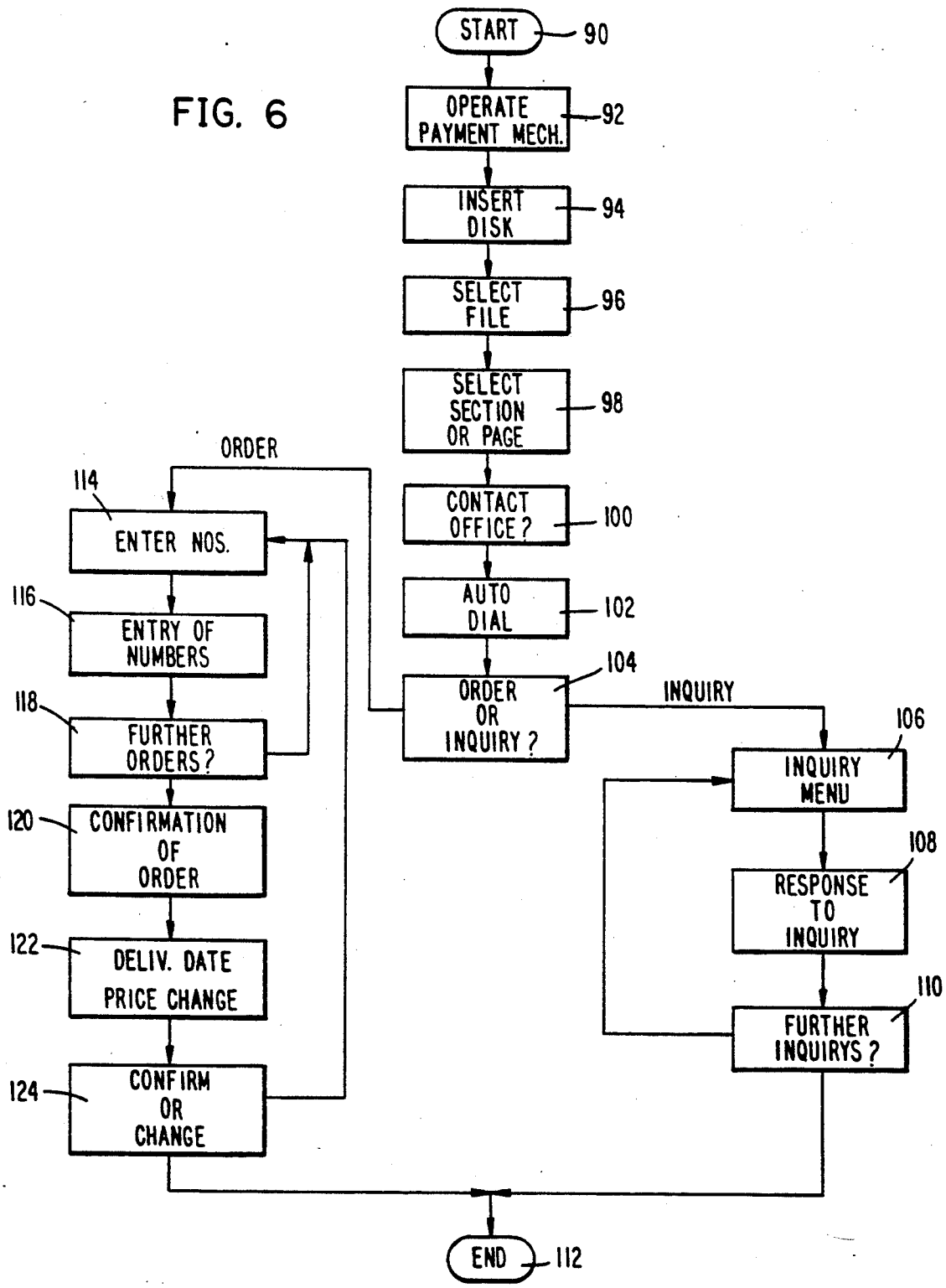

ENHANCED ACCESS TO TELECOMMUNICATIONS NETWORK

TECHNICAL FIELD

This invention relates to telecommunications services and systems and more particularly to systems and services which provide enhanced public coin station access to telecommunications networks.

BACKGROUND ART

Conventional public telephones or pay phones provide access to the public switched telephone network through the deposit of coins, accessing of an operator, or automated usage of a credit card. Documentary directories have been customarily provided at the site of the pay stations but are increasingly ineffective due to the expansion of the volume of directory information necessary to be provided and due to vandalism which rapidly reduces the provided documentary information to a virtually unusable state. One proposed solution to this problem which has been at least partially implemented in at least one European country is the provision at the site of each public telephone station of an electronic directory database, display screen and controls for providing the phone user with an electronically accessible directory.

Other proposals have been made for the provision of console type public telephone stations in kiosk or other form for providing to the public a variety of data and mechanisms for utilizing such data. One such proposal is described in U.S. Pat. No. 4,720,849 issued Jan. 19, 1988, to Kou Tayama. The Tayama patent describes several embodiments of a console type display apparatus which may be installed in or in front of a railroad station to display hotel information. The device is suitable for desk or wall mounting or may be provided in kiosk form. A display screen is provided for displaying information in response to actuation of an operating switch. A card or coin insert slot is provided along with a search switch. The unit is provided with a library of various video disks which may be selected for display. The operation of the device is as follows:

Video disks containing information regarding predetermined hotels are provided in the video disk library in a display/memory device. When power is provided the information is successively or seriatim displayed on the screen initially in outline form without details. A desired display of information may be selected by operating numeral keys to select, for example, hotel information, motion picture theater information, or the like. After the type of information is selected, a search switch is operated to cause display information to be fast fed over the screen at intervals of 5 seconds, for example. When information on a desired hotel is displayed the search key is released. As a result detailed information regarding that hotel is successively displayed. At the same time a voice commercial is produced from a speaker. In this case the last frame is displayed for a longer period such as 10 seconds.

When the user is satisfied with the detailed information, he/she unhooks the handset, inserts a magnetic card or a coin into the card insert section, and depresses the call switch. As a result the dial number corresponding to the displayed information is automatically searched from a dial number memory bank in the device and a telephone circuit to the telephone set in the hotel is established. Before the user's speech starts, the destination hotel is informed of the location of the information display apparatus as the source of call in synthesized voice, for instance, "New York", which is reproduced from data stored in a voice synthesis unit in the device.

If the user does not desire to make a reservation he/she may wait for ten seconds or depress the search switch again. As a result the display of further outline hotel information is resumed.

The procedure for operating the device is described in an announcement to the user from the speaker. This is in addition to the procedure for operation described in an information plate attached to the unit. For example, when the logic control determines that the search is for a hotel, it may play a prompt such as "Keep search button depressed until your favorite hotel is displayed."

While installations of the type proposed in the Tayama patent are capable of providing directory and other services they involve elaborate and costly auxiliary installations at existing public coin telephones. It is a purpose of the present invention to supply in a cost efficient and extremely versatile manner varied information at public pay telephone stations.

DISCLOSURE OF THE INVENTION

According to the invention there are provided public pay telephones which are adapted to accept user carried cards or disks storing a virtually infinite variety of data or information for interacting with the new public telephone station. In a preferred form the user carried data comprises a CD ROM disk or more particularly a CDI disk. The telephone station is provided with a display screen and certain control switches. Interaction is provided between the database in the user disk and/or distributed databases in the telecommunications network. As one objective the system is capable of providing basic directory information and auto-dialing. However the invention comprehends more sophisticated services based upon the massive data storage capacity of a CDI disk used in conjunction with a microprocessor and memory in the telephone station. A standard compact disk is capable of storing 650 megabytes of information, 300,000 pages of text, or 1000 floppy disks' storage, or 7000 photographic quality pictures or 72 minutes partial screen 15 frames/second motion video or hours of audio. Because each user may carry one or more disks suited to his/her personal or business interests it will be appreciated that the potential variety of usages of the system of the invention is enormous.

It is accordingly an object of the present invention to provide an improved public telephone station which accepts and interacts with user carried databases to serve a variety of purposes.

It is another object of the invention to provide such a device in a compact form capable of economic implementation in public telephone stations with the ability to withstand the rough usage to which such stations are subjected.

It is another object of the invention to provide an improved public telephone station of the foregoing type which requires no substantial enlargement of the size of the public pay station.

It is yet another object of the invention to provide a unique public telephone station which serves as a public terminal without requiring the placing of a telephone call.

It is still another object of the invention to provide a new and improved public telephone station system which places at the disposal of a user not only the distributed database capacity of the telephone network but also data unique to the particular user.

It is another object of the invention to provide an improved public telephone station and methodology which is straightforward and simple to use.

It is another object of the invention to provide an improved public telephone station and methodology of the foregoing type which is based on existing technology standards.

It is yet another object of the invention to provide an improved public pay telephone station which serves as a data terminal for a virtually unlimited range of data including but not limited to yellow and white page directory data, specialty guides such as to restaurants, theaters, physicians, etc., video, audio, graphics, maps, business databases, and advertiser display advertisements.

These and further objects and advantages of the invention will become more apparent upon reference to the following specification, claims and drawings.

BRIEF DESCRIPTION OF DRAWINGS

FIG. 6 is a flow diagram illustrating one example of usage of the system of the invention.

BEST MODE FOR CARRYING OUT THE INVENTION

Figure 1:
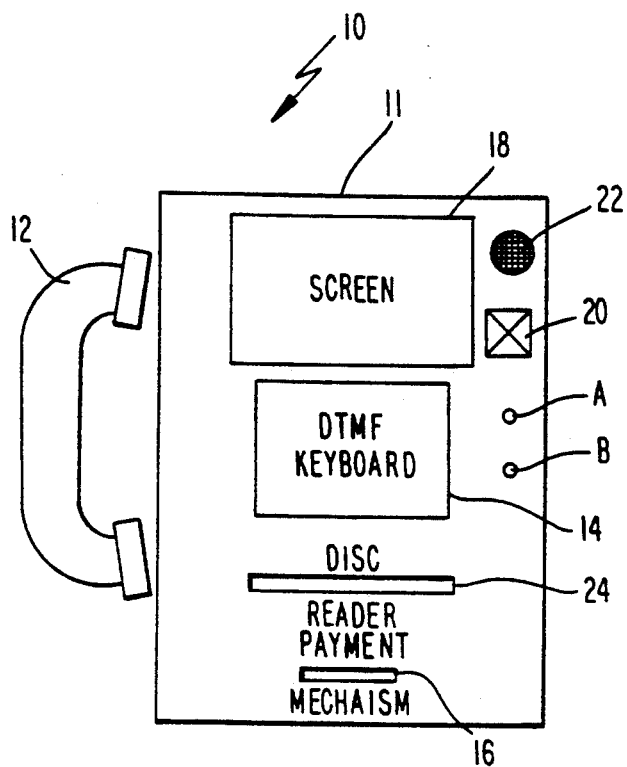
FIG. 1 shows a diagrammatic illustration of a public pay telephone station constructed according to a preferred embodiment of the invention.

Referring to FIG. 1 there is shown at 10 a public pay station constructed according to the invention and comprising a case or cabinet 11 and conventional hand set 12. The telephone is provided with a conventional DTMF key board 14 and a payment mechanism illustrated as a coin or card slot (or both) 16. According to the invention the telephone is provided with a display screen 18 and cursor control switches or buttons 20. The cursor buttons may be provided in the conventional x-y or up-down, left-right form. Also provided is a speaker 22 and manual switches designated A and B. A slot 24 is provided to receive a disk containing data such as a CD ROM or CDI disk. Further details of the public pay telephone station of FIG. 1 are illustrated in the block diagram found in FIG. 2.

Figure 2:
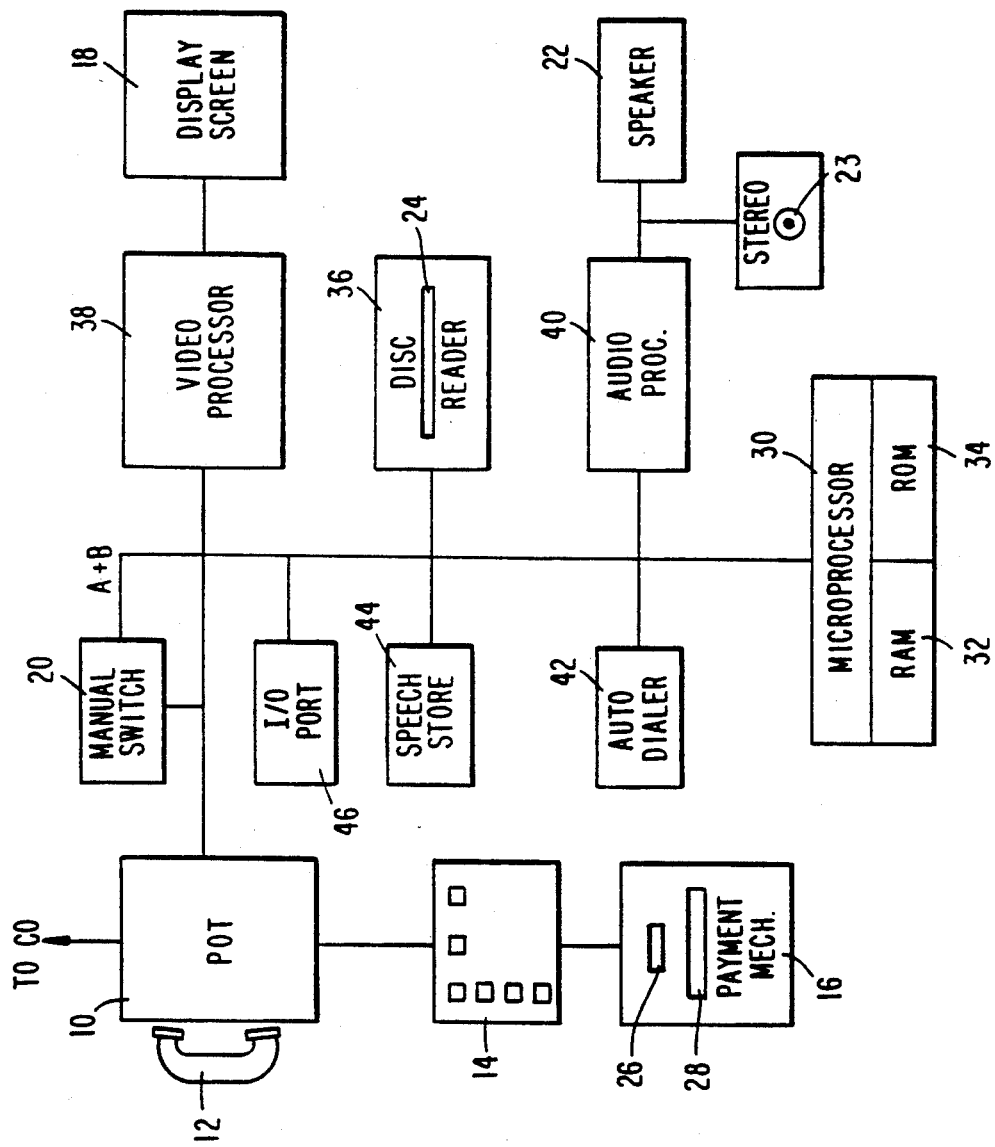
FIG. 2 is a simplified block diagram of the public pay telephone station illustrated in FIG. 1.

Referring to FIG. 2 the plain old telephone components of the station of FIG. 1 are illustrated at 10 with the hand set 12, DTMF key board 14, and payment mechanism 16. The payment mechanism is shown as containing a coin slot 26 and a credit/debit card slot 28. These slots in the payment mechanism function in the conventional manner to provide access to the public telephone station.

Also contained in the public telephone station is a microprocessor 30 having RAM and ROM storage 32 and 34. A disk reader or player 36 is provided in conjunction with the disk slot 24 of FIG. 1 and is controlled by the microprocessor 30. According to the invention the disk is preferably a CDI disk and has stored thereon audio, video, textual and program related data. The disk reader is connected to a video processor 38 which drives the display screen 18. The reader is also connected to an audio processor 40 which drives the speaker 22. In addition to the speaker the pay station may also be provided with a mono or stereo phone jack 23. The disk is preferably a CDI disk and the public telephone station is provided with the hardware to effectuate a CDI system. The new pay station also includes an auto-dialer 42, local speech store 44, I/O port 46, and manual operating switches 20A and B.

As will be understood by those skilled in the art a CDI system is a real-time system capable of playing CDI disks and decoding the various types of data (i.e., audio, video, text, program related data) from the disk. CDI is the name given to both the Compact Disk Interactive media (the disk) and the Compact Disk Interactive media system (the hardware) that conform to the specifications available in the Compact Disk Interactive Full Functional Specification ("Green Book"), N. V. Philips and Sony Corporation, Sept. 1990. That specification also complies with the specifications defined in the CD-Digital Audio (CD-DA) Specification ("Red Book"), N. V. Philips and Sony Corporation. See also the OS-9 Technical Manual portion of the Green Book, Microware Systems Corporation, 1990. Such specifications are herewith incorporated by reference.

Figure 4:
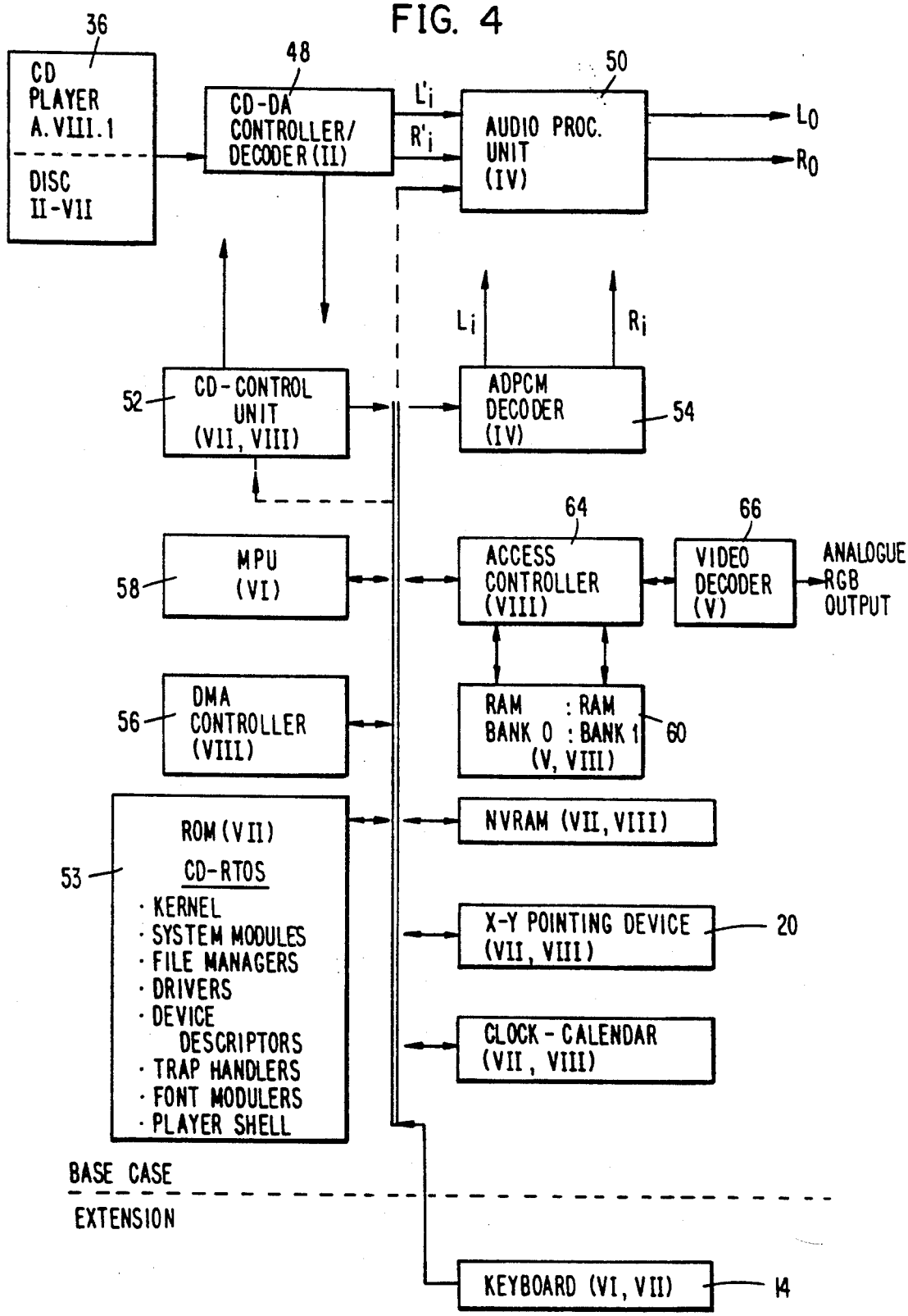
FIG. 4 is a block diagram of the preferred CDI system utilized in the public pay telephone station constructed according to the invention.

A CDI system is made up of hardware and system software which conforms to the CDI Base Case specification detailed in Chapter VIII of the above cited Green Book. The Base Case model is illustrated in FIG. 4. Referring to that figure, the CD-Control Unit 52, in response to commands from the operating system (i.e., CD-FM of CD-RTOS 53), accesses the disk via the CD-DA Controller/Decoder 48. When CD-DA tracks are being accessed the data is transferred directly to the Audio Processing Unit 50 whose function is to control the attenuation, set the panning and output to analog audio left/right signals where stereo signals are being generated.

If a CDI track is being accessed the CD-Control Unit 52, in response to commands from the operating system (i.e., CD-FM 53), selects sectors from the data stream and transfers the CDI sectors to the ADPCM decoder 54 (for direct audio playback) or, via the system bus, to memory (for audio, video or program related data). Audio data is usually routed continuously to the ADPCM decoder which decodes it in real-time to produce analog audio, which is output via the Audio Processing Unit 50. Video and program related data as well as audio data to be stored in a soundmap is routed, by means of the DMA controller 56 or MPU 58, to RAM 60.

The RAM is organized as two separate banks each of a minimum size of 512 KB, which is shared between MPU 58 and video controller 66 by an Access Controller 64. Although the amount of memory used by CD-RTOS 53 and the system modules will vary depending upon the number of processes active and the number of open paths, it is guaranteed at start-up of the application to be less than 64 k, split evenly between the two banks.

All other RAM may be used for either audio, video or program related data.

Video data consists of both pixel data and video control data. The display of pixel data from RAM is by means of a two path display controller. Video data is accessed independently in the two banks of RAM, and the two display paths are combined to produce a single analog RGB video output from the video decoder 66.

The operating system (CD-RTOS) is contained in ROM. Moreover, there is a small area of non-volatile RAM which is available both to the operating system and application programs. The user interface is primarily by means of an X-Y pointing device. The telephone DTMF key board is supported, but does not form a part of the Base Case system.

Figure 5:
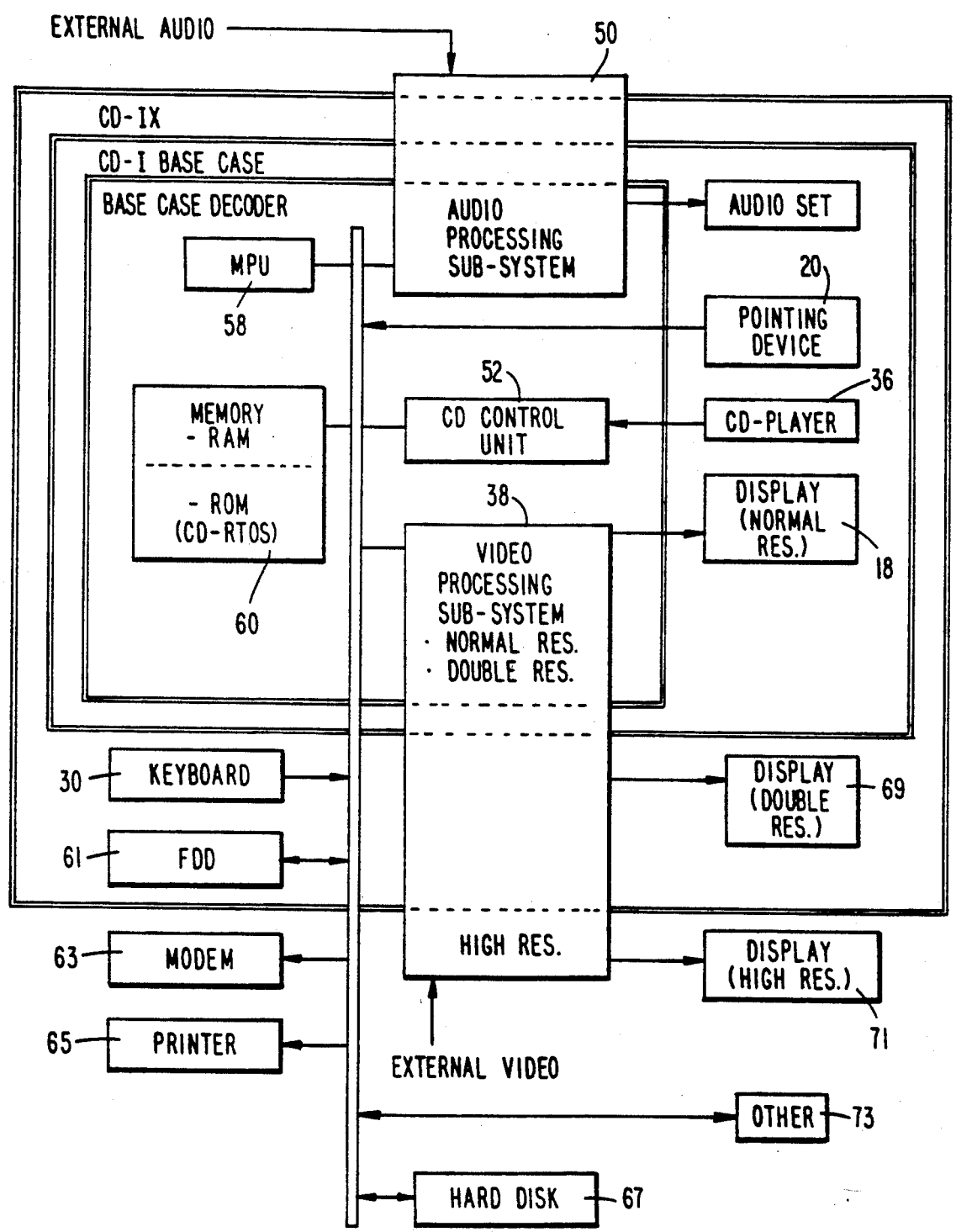
FIG. 5 shows the CDI system of FIG. 4 broken down into a CDI Base Case decoder and CDI Base Case peripherals.

The CDI Base Case is illustrated in FIG. 5 broken down into a CDI Base Case decoder and CDI Base Case peripherals. The CDI Base Case decoder is the nucleus of the system and comprises the microprocessor 58, audio processor 50, video processor 38, memory 60 and CDI control unit 52. CDI peripherals comprise input and output devices used in connection with the CDI Base Case decoder. These may include FDD 61, Modem 63, Printer 65, Hard Disk 67, Double Resolution and High Resolution Displays 69, 71 and other devices 73.

The cursor switch 20 allows the user to control the position of the screen graphics cursor. Depressing these keys does not automatically cause the desired action, this is brought about by the application program and actuation of the action keys A or B.

Figure 3:
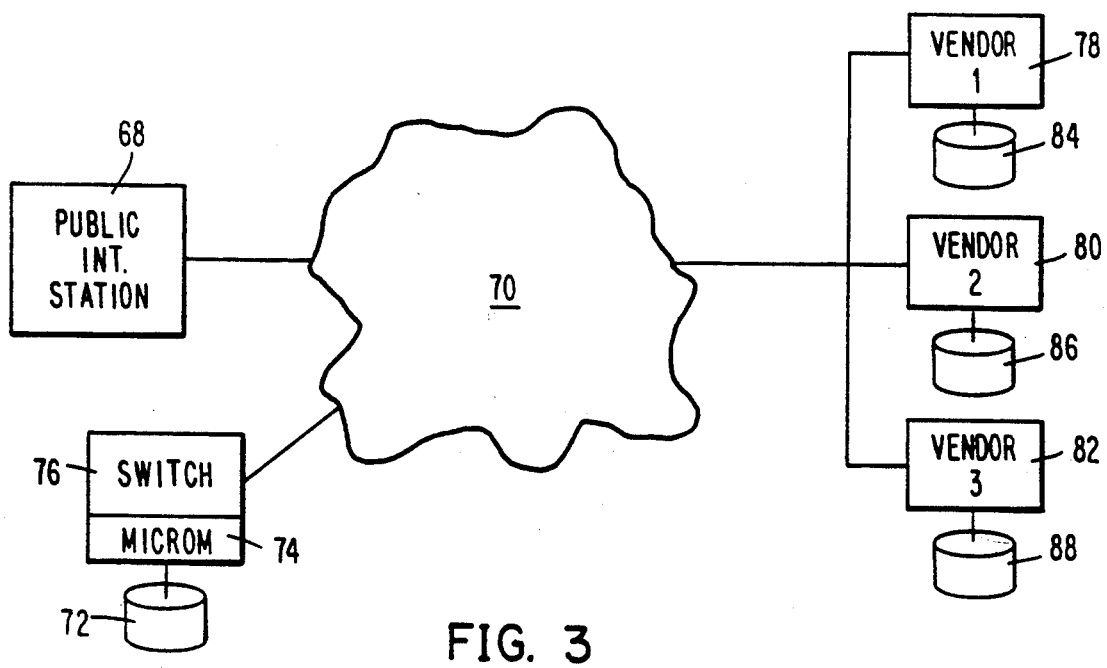
FIG. 3 is a block diagram showing the relationship of the public pay telephone station of FIG. 1 to vendor databases and ordering systems.

Referring to FIG. 3 the relationship of the interactive public telephone station with the telephone network is illustrated according to one embodiment of the invention. A public interactive station 68 is connected to the public telephone network illustrated as a cloud 70. According to one embodiment of the invention there is provided a directory store 72 and microprocessor 74 connected to the network through a switch 76. The directory store is supplied by the network and the switch 76 may be a central office switch.

Also connected to the network 70 are a series of vendor data processors 78, 80 and 82 each having a store 84, 86 and 88.

The operation of the system is now described. Users of the system are provided with one or more CD ROM or CDI disks having stored thereon data of interest to the user. Thus a salesman may have a disk having stored thereon the catalog of his company, a directory of telephone numbers of the personnel of the company, telephone directories and maps of the cities within his territory, and a large variety of other data.

Assuming the salesman has obtained an order from a customer and wishes to place the order, the salesman may access a public telephone station by inserting a coin or credit card into the payment mechanism and inserting his disk into the disk slot. The CDI module in the public station actuates the disk drive and other elements of the CDI system. A menu from the disk is presented upon the screen and the salesman may select the catalog pages from which merchandise is to be ordered. The selected page is displayed on the screen whereupon the salesman may utilize the cursor control to designate the items purchased and use the telephone key board to enter the number of each item. The salesman may connect to his sales office by depressing button A whereupon the auto-dialer establishes a connection to the pertinent vendor installation 78-82 and its database 84-88. Information retrieved from that database, such as whether or not the item is in inventory and whether or not the price has changed, then appears on the screen and the salesman can either confirm, withdraw or change the order by depressing pre-designated keys on the DTMF key board.

This particular example of usage is illustrated in flow chart form in further detail in FIG. 6. Referring to that figure, START is indicated at 90. The salesman operates the payment mechanism at 92 by inserting a coin or credit card. It will be understood that customary security entries such as a PIN number may also be required. The pay station may be provided with a suitable door or closure mechanism for sealing the disk slot until such time as the pay station has been properly accessed.

The salesman inserts the disk at 94 whereupon a menu appears on the screen at 96. It is to be understood that the very large capacity of the CDI disk makes it possible for the disk to contain a wealth of data over and above the catalog and directory information which may be desired by the disk owner for business purposes. Thus the disk may also contain audio and video for entertainment purposes to be accessed by a CDI player other than the public telephone station.

Assuming that the salesman selects the catalog and specific page from the catalog at 98, the screen thereupon presents an inquiry at 100 as to whether or not it is desired to contact the company office. It is to be understood that this inquiry and other prompts may also be audibilized through the speaker if so desired. The salesman may respond to this inquiry by depressing the actuating button A or B at 102 whereupon auto-dialing of the company number obtained from the salesman's disk occurs at 102.

At 104 the further inquiry appears on the screen as to whether the salesman desires to place an order or make an inquiry. If an inquiry is indicated an inquiry menu next appears at 106. The salesman may thereupon designate the selected inquiry, depress the actuating button B, and receive a response to the inquiry at 108. By way of example, the inquiry may involve the availability of a selected item or any change in price. Following presentation of the response to the inquiry the screen at 110 presents an inquiry as to whether there are any further requests. If the response is affirmative the program proceeds back to the inquiry menu at 106. If the response is negative the program ends at 112.

If the response to the inquiry at 104 was that it was desired to place an order there results an ordering prompt to enter the numbers of items at 114. Following this there is the entry of the items from the selected page at 116 by use of the DTMF key board numbers followed by depressing the button B once per page on which items have been ordered to conclude and enter the order for that page. The screen at 118 thereupon presents an inquiry as to whether there are further orders. If the answer is affirmative the program returns to 114. If the response is negative the screen presents a confirmation of the order as placed at 120. A search of the vendor's database is then performed and the delivery date and price change, if any, are presented at 122. The screen next inquires at 124 as to whether it is desired to confirm the order or change. If the order is to be confirmed the program ends at 112. If the order is to be changed the program returns to 114.

In the methodology discussed all interaction between the user, the user's database (the CDI disk), and distributed data available from the network has been handled in an automated manner using the DTMF key board. It will be understood that this represents an efficient tool for handling various tasks but that personal contact with human operators may also be provided. Thus in the ordering example one or more menus may include the inquiry "Operator desired? Press *". Alternatively an entire directory type menu may be presented for selecting varying persons related to the particular transaction in progress. In all cases the user may use the public telephone station in its basic telephone capacity to reach any desired directory number either with or without auto-dialing.

It will be apparent that the system and methodology here described in terms of order placing by a salesman is also applicable to a variety of other applications. Examples of such applications are ordering from disk stored restaurant menus, making hotel reservations, making transportation reservations or the like.

Another example of a use of the system of the invention is a traveler or business person desiring taxi service in a strange city. By actuating the payment mechanism of the public telephone station and inserting his/her disk containing directory information which includes the particular city the user can call up yellow page directory information for taxi service. The public pay station has included in its ROM an identification of the telephone involved and its location and the disk has stored thereon geographic data relating to the listed taxi services. This permits the microprocessor to select from the taxi companies in that city a company in a geographic position to render prompt service to that specific public telephone station locale. This may be effected by a program actuated cursor designating the specific taxi company and directory number. The user may then depress the A button whereupon the auto-dialer is actuated to initiate a call to the thus designated taxi company. If desired the user may also access map information from the disk to permit the user to familiarize himself/herself with the area. This same methodology may be utilized for the purpose of selecting nearby hotels, restaurants, fast food establishments, etc.

As an alternative to the foregoing procedure the system of the invention is capable of providing directory information of this nature to users who do not possess a disk containing directory information for the particular city involved. In such a situation the user can call up the directory information from the telephone network directory store 72 and follow the same procedure with respect to selecting taxi service. It will be apparent that other directory and related information may also be obtained by the user in this manner.

Still another example of the utility of the system of the invention is a use of a public telephone station as a means for access to information from the disk without necessarily placing a telephone call. According to this embodiment of the invention a user may gain access to the telephone and/or network by actuating the payment mechanism for this specific purpose. To this end the telephone station may be provided with a button specifically designating this type of service or a pre-designated key on the DTMF key board may be used. Upon obtaining access the user may insert his/her disk and use the telephone station screen for displaying and audibly reproducing information on the disk. Public pay stations thus may be conveniently provided in public buildings such as airports for use by passengers with their storage media for entertainment purposes. If desired the telephone may also be accessed to obtain information from distributed databases in the network.

It will be apparent from the foregoing that there is provided according to the invention unique public pay telephone stations which are adapted to accept user carried data mediums preferably in the form of CDI disks which are capable of storing a virtually infinite variety of data or information for interacting with the new public telephone station. The telephone station is provided with a display screen and control switches. Interaction is provided between the database in the user disk and distributed databases in the telecommunications network. The system provides sophisticated services based upon the massive data storage capacity of a CDI disk used in conjunction with a microprocessor and memory in the telephone station as combined with the virtually limitless distributed storage data and capabilities of the telephone network.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. In a public switched telephone network including public telephone stations the combination comprising:
   a public telephone station having a storage medium drive for accepting a storage medium inserted by a user and driving said storage medium;
   display means associated with said public telephone station;
   microprocessor means in said public telephone station for driving said display means responsive at least partially to program data on said user's storage medium;
   switching means in said public telephone station for accessing said public switched telephone network and databases connected thereto to provide on said display means a display of data controlled at least partially by data from at least one database other than the data stored in said storage medium.

2. A public telephone station according to claim 1 wherein said databases connected to said telephone network are interrelated to and interactive with data stored in said storage medium to effect a transaction in relation thereto.

3. A public telephone station according to claim 2 wherein said database connected to said public telephone network provides to said user information regarding the availability of items corresponding to data designated from the database in said storage medium.

4. A public telephone station according to claim 1 wherein said microprocessor means interacts with data from said database other than the data stored in said storage medium to present on said display means data related to data selected by the user from data on said user's storage medium.

5. A public telephone station according to claim 1 including payment mechanism means for activating said storage medium drive following actuation of said payment mechanism means by said user.

6. A public telephone station according to claim 1 including means for establishing a connection between said user and a station identified in data displayed on said display means.

7. A public telephone station according to claim 1 including video and audio processing means for processing data stored on said user's storage medium.

8. In a public switched telephone network including public telephone stations the combination comprising:
a public telephone station having a storage medium drive for accepting a storage medium inserted by a user and driving said storage medium;
display means associated with said public telephone station;
microprocessor means in said public telephone station responsive at least partially to program data on said user's storage medium for driving video processor means to cause display means to display data from said data stored in said user's storage medium responsive to selections made by said user.

9. A public telephone station according to claim 8 including switching means in said public telephone station for accessing said public switched telephone network in response to data displayed on said display means at least partially from data stored in said storage medium.

10. A public telephone station according to claim 9 including switching means in said public telephone station for accessing said public switched telephone network and databases connected thereto to provide on said display means a display of data controlled at least partially by data from at least one database other than the data stored in said storage medium.

11. A public telephone station according to claim 8 including payment mechanism means for activating said storage medium drive following actuation of said payment mechanism means by said user.

12. A method for accessing a public telephone network (PTN) using a public telephone station (PTS) comprising the steps of:
actuating the payment mechanism of said PTS;
inserting a storage medium in said PTS;
actuating drive and reader means for said storage medium;
selecting data on said storage medium and actuating a display thereof;
actuating first control means associated with said PTS to select a displayed item; and
actuating second control means associated with said PTS to access data stored in said PTN.

13. A method according to claim 12 including the step of actuating third control means associated with said PTS to close a transaction responsive to said accessing of data stored in said PTN.

14. A method according to claim 13 wherein said transaction comprises placing an order.

15. A method according to claim 13 wherein said transaction comprises dialing a directory number.

16. A method for accessing a public telephone network (PTN) using a public telephone station (PTS) comprising the steps of:
actuating the payment mechanism of said PTS;
inserting a storage medium in said PTS;
actuating drive and reader means for said storage medium;
selecting data on said storage medium and actuating a display thereof;
actuating first control means associated with said PTS to select a displayed item;
actuating second control means to effect connection to said PTN; and
actuating third control means associated with said PTS to access data stored in said PTN relating to said displayed item.

17. A method according to claim 16 including the step of actuating further control means on said PTS to conclude a transaction relating to said displayed item.

18. A method according to claim 17 wherein said transaction comprises placing an order.

19. A method for accessing a public telephone network (PTN) comprising the steps of:
actuating the payment mechanism of a public telephone station (PTS);
inserting a CD disk in said PTS, said disk having stored thereon data selected by the PTS user;
actuating drive and reader means for said disk;
selecting a category of data on said disk and actuating a display thereof on said PTS;
actuating first control means associated with said PTS to select a displayed data item;
actuating second control means associated with said PTS to effect connection to said PTN; and
actuating third control means associated with said PTS to access data storage connected to said PTN.

20. A method for accessing a public telephone network (PTN) comprising the steps of:
actuating the payment mechanism of a public telephone station (PTS);
inserting a CD disk in said PTS, said disk having stored thereon data selected by the PTS user;
actuating drive and reader means for said disk;
selecting a category of data on said disk and actuating a display thereof on said PTS;
actuating first control means to select a displayed data item;
actuating second control means to effect connection to said PTN; and
actuating third control means to access data stored in and to exchange data with storage means connected to said PTN.

21. A method for accessing a public telephone network (PTN) using a public telephone station (PTS) comprising the steps of:
inserting a storage medium in said PTS;
actuating drive and reader means for said storage medium;
selecting data on said storage medium and actuating a display thereof;
actuating first control means associated with said PTS to select a displayed item; and
actuating second control means associated with said PTS to access data stored in said PTN.

22. A method for accessing a public telephone network (PTN) using a public telephone station (PTS) comprising the steps of:
inserting a storage medium in said PTS;
actuating drive and reader means for said storage medium;
selecting data on said storage medium and actuating a display thereof;
actuating first control means associated with said PTS to select a displayed item;
actuating second control means to effect connection to said PTN; and
actuating third control means associated with said PTS to access data stored in said PTN relating to said displayed item.

* * * * *